Patented Dec. 12, 1950

2,533,694

UNITED STATES PATENT OFFICE 2,533,694

CONDITIONING IRON CATALYST

Robert V. Safford, Tulsa, Okla., assignor to Stanolind Oil and Gas Company, Tulsa, Okla., a corporation of Delaware No Drawing. Application February 1, 1947, Serial No. 725,974

4 Claims. (Cl. 260—449.6)

This invention is related to the conversion of carbon monoxide and hydrogen to liquid hydrocarbons using iron-alkali metal catalysts. It deals primarily with the employment of iron-alkali metal catalyst in a finely divided form suspended in a stream of gaseous reactants and especially with the sensitizing of said catalysts in a finely divided form.

The use of iron-alkali metal catalysts for the conversion of carbon monoxide to liquid hydrocarbons has long been known to the art. Commercial processes, however, could not be developed because of the extreme difficulties encountered in carrying out this reaction on a large scale. In certain instances, however, where normal economic forces were inoperative, iron alkali catalysts were employed on a moderate scale in fixed bed units for the synthesis of hydrocarbons. The use of fluidized finely divided solid catalysts in the synthesis of hydrocarbons has been proposed as a means for overcoming the many difficulties which stood in the way of a commercial synthetic oil process. However, attempts to apply the fluidized-solid techniques to the synthesis of hydrocarbons using iron-alkali metal catalysts brought to light a previously unencountered, but serious problem, the solution of which is vital to the commercial development of a synthetic oil process using finely divided iron-alkali metal catalysts. This problem is the unexpected defluidization of iron-alkali metal catalysts.

It has been repeatedly observed that in an effort to adapt the fluidized solids technique to iron-alkali metal catalysts the catalysts undergo a phenomenon of defluidization. For example, during a period of heretofore smooth and satisfactory operation the suspended particles of catalyst suddenly agglomerate and settle out with the result that the normal fluidization process fails completely and the reaction abruptly ceases. Many explanations have been offered for this tendency, none of which appears at this time to be wholly satisfactory. It is certain, however, that not only is the linear velocity of the aerating gases of great importance but also the physical condition of the catalyst, its chemical composition and the operating conditions.

Operating conditions and special techniques have been developed whereby the catalyst can be retained in the fluidized condition in the synthesis step for long periods of time, but these special methods are not applicable to the catalyst conditioning step. The conditioning operation to which I refer consists in contacting the finely divided catalyst with a reducing gas containing hydrogen under a critical range of conditions, the use of which is the essence of my invention. This conditioning step involves not only a partial reduction of the oxides which are present in the catalyst but also the adsorption of some of the reducing gases on the surface of the catalyst.

The conventional method for conditioning iron catalyst which has been activated with an alkali metal compound consists in passing a stream of hydrogen over a fixed bed of the granular catalyst at about 1100° F. Space velocity is not critical and the treatment is completed in about 4 to 6 hours. The conditioned catalyst was then pulverized and subsequently introduced as a finely divided solid into a synthol converter operating on the fluidized solid principle. Obviously, it is necessary to protect the reduced catalyst from oxidation during the grinding operation and during the transfer to the converter.

When an attempt is made to effect this conditioning under the same conditions of temperature and pressure in the suspended fluid phase, the catalyst becomes defluidized.

It is difficult to explain why the fluidization of the catalyst failed under the conventional conditions of temperature, i. e., at a temperature between about 1000 to 1200° F. Apparently, after the catalyst has been partially reduced, it tends to become cohesive with the result that the catalyst particles set or agglomerate, and the hydrogen channels through the defluidized catalyst. The cohesiveness that develops probably is due to the secretion or migration of free caustic from the pores of the catalyst particle. The stickiness resulting from the caustic, which is at a temperature above its melting point under these conditions of temperature, apparently causes the catalyst to agglomerate with the resulting failure of fluidization. The agglomerated catalyst is friable and disintegrates to a powder upon cooling. This disintegration of the agglomerated mass probably is the result of stresses produced by the thermal contraction. On the other hand, perhaps the alkali returns to the pores from which it migrated at the higher temperature.

It is therefore an object of this invention to provide a method and means for conditioning finely divided iron catalyst, which has been activated with alkali, in the dense fluidized phase. Another object of my invention is to provide a method and means for treating finely divided promoted iron catalyst with hydrogen at the optimum temperature at which fluidization can be maintained. These and other objects will become apparent as the description of my invention proceeds.

Briefly, my invention contemplates a critical range of conditions in which the defluidization can be avoided in the catalyst conditioning step. In this operation, control of temperature is of prime importance and, by its control to within a rather limited range, I have been able to satisfactorily condition the catalyst in the fluidized state. In general, it appears that the critical temperature range of this operation is related to some extent to the alkali content of the catalyst. I have developed a correlation by which I adjust the conditions to alkali-metal content of the catalyst.

By my invention, I have eliminated the troublesome procedure of conditioning the catalyst in a fixed bed operation and then grinding the catalyst in a protecting atmosphere. I have also avoided the necessity of protecting the sensitized pulverized catalyst from traces of oxygen during storage and during transfer from said pulverizing means. Likewise, I have now been able to condition a catalyst which has been prepared in a finely divided state or finely divided catalyst which previously has been regenerated without the necessity of an intermediate pelleting or analogous step and it is possible to condition the catalyst "in situ" avoiding the necessity of special apparatus. Furthermore, I have found indications that the practice of my invention during conditioning of catalyst in the fluidized state eliminates some of the difficulties which heretofore take place in the subsequent synthesis step.

The hydrocarbon synthesis process with which this invention is concerned, employs an iron catalyst and is conducted at a temperature of between about 400 and 750° F. and at pressures of between about 75 and 400 pounds per square inch. A preferred range of temperature is between 450 and 675° F. and a pressure of between about 175 and about 325 pounds per square inch. The space velocity through the reactor should be between about 5 and 15 cubic feet of CO per hour per pound of catalyst within the reactor. A hydrogen to carbon monoxide ratio of between about 2 to 1 and 5 to 1 can be used with an optimum carbon monoxide content of between about 9 and about 15% based upon the total gas feed to the reactor. Ordinarily, the actual feed to the synthesis reactor will also include from 1 to 3 times as much carbon dioxide as carbon monoxide.

The catalyst for use in such a process should be in a finely divided form capable of being fluidized by gas flowing upwardly through the bed at low velocities to maintain the catalyst in a dense turbulent suspended phase. The catalyst particles can be of the order of between about 2 and 200 microns, preferably 20 to 100 microns in particle size. With vertical gas velocities of the order of between about 0.5 and about 5.0 feet per second, preferably between about 1 and 3, for example, about 2 feet per second, a liquid-like dense phase of catalyst is obtained. In such a liquid-like dense phase, the bulk density of the catalyst is between about 10 and 80%, preferably between about 20 and 60%; e. g. about 30% of the density of the settled catalyst material. Catalyst particles without a support will have a settled bulk density as high as between about 120 and 150 pounds per cubic foot, whereas the settled bulk density of the iron catalyst supported by Super Filtrol or similar carrier may be as low as 10 pounds per cubic foot. The vertical or linear velocity of the gas is, in any event, regulated so as to produce a turbulent suspension of catalyst within the contacting zone; e. g., the hydrocarbon synthesis zone, the catalyst preparation zone, or the like.

The iron type catalyst for use in my system can be derived by a number of methods well known in the art. One embodiment is that used in ammonia synthesis, such a catalyst ordinarily being prepared by oxidizing iron in a stream of oxygen to produce a fused mass and then crushing the fused oxide. A very effective and economical catalyst can be prepared by first roasting iron pyrites. Another catalyst is one of the precipitated type which may be supported on Super Filtrol or other finely divided inert carriers. The iron catalyst, however derived, can be promoted by the addition of between 0.1 and 2.5% for example, between about 0.25 and about 1% of a metal alkali compound such as by adsorbing KF thereon before conditioning. The promoted iron catalyst is then treated with hydrogen before use in synthesis.

A preferred technique for preparing catalyst is to roast a material containing a compound of iron with a combustible material or in admixture with a combustible material. The heat of combustion of the combustible components should be sufficient to raise the temperature during the roasting operation to at least 1500° F. Examples of suitable combustible components are sulfur and carbon.

An excellent method of catalyst preparation is to admix hematite ($Fe_2O_3$) with about 2% or more potassium carbonate, heat the mixture to a temperature above 1000° C., i. e., to effect incipient fusing or sintering, and to convert the iron oxide to $Fe_3O_4$, extract excess potassium from the sintered mass with water so that only about 1 to 2%; e. g., about .5% potassium will remain, grind the catalyst to the desired particle size and treat the $Fe_3O_4$ containing the residual potassium with hydrogen or hydrogen-rich gas.

It has been demonstrated that a finely divided promoted iron catalyst can be conditioned while maintained in a fluidized state if the temperature is held between about 700–900° F.; i. e., at about 50 to about 300° F. above the proposed synthesis temperature. By maintaining a substantial hydrogen pressure, it is possible to accomplish the high degree of activation at these lower temperatures in a period of 10 to 30 hours or more. The conditioning is preferably carried out at between about 200–300 pounds per square inch and can, for example, be conducted at the same pressure as is used in the synthol converter. Shorter periods at lower pressure, however, are effective and give catalysts with an initial activity closer to the average activity in the synthesis.

In general, catalyst containing between about 0.1% and about 2.0% alkali based on the weight of unreduced catalyst can be fluidized at a temperature of between about 50 and 300° F. above the hydrocarbon synthesis temperature and the temperature at which agglomeration occurs has been found to vary. For example, with about 1.4% alkali, the temperature for maintaining a mobile iron catalyst appears to be as low as about 700° F. On the other hand, with about 1.0% adsorbed alkali metal compound a pronounced reduction in the mobility of the catalyst has been observed with a higher temperature of about 750° F. The maximum temperature at which fluidization of the finely divided iron catalyst containing about 0.5% alkali can be maintained in the presence of a reducing gas is somewhat higher and may be about 800° F. With smaller percentages, i. e., about 0.1%, the dense turbulent suspended phase can be maintained without agglomeration at substantially higher temperatures but below about 900° F. If agglomeration does occur at a given temperature level with the resultant tendency to defluidize, the catalyst can be maintained fluidized at a substantially lower temperature, for example, at least about 5° F. and preferably at least about 50° F. below the defluidization temperature, i. e., the temperature at which agglomeration occurs.

Although the chemical nature of the catalyst particles cannot be defined with precision, it appears to be a mixture of reduced Fe and FeO and in the synthesis zone a portion thereof is converted to $Fe_2C$. Potassium stabilizes the state of reduction of the iron and may be initially added as a carbonate as above described or as a fluoride, for example as KF, or other salt or oxide. When sodium is substituted for potassium as a promoter, it may be used in much smaller amounts, usually about $\frac{1}{5}$ as much as in the case of potassium. Small amounts of other materials or metal oxides may be employed with the catalyst in manners and for purposes well known to the art.

It is unnecessary that the catalyst be completely reduced and in fact complete reduction or long contact with hydrogen appears to result in chemically adsorbed hydrogen which renders the catalyst extremely active. It has been found that beneficial results can be obtained with the reduced iron catalyst of the type described herein if it is brought on-stream gradually and preferably by subjecting the treated catalyst at conventional conversion temperature and pressure to pretreatment with a synthesis gas low in carbon monoxide and gradually increasing the carbon monoxide content to the indicated optimum. A suitable source of such pretreating gas is a recycle stream from the synthesis proper. This pretreatment or induction step can be carried out in a separate vessel interposed between the hydrogen treating zone and the synthesis reactor and the induced catalyst transferred to the synthol converter. When the zones are all maintained at approximately the same pressure and the catalyst is in a dense turbulent fluid phase, the catalyst can be progressively transferred from the hydrogen treating zone to the induction zone and thence into the hydrocarbon synthesis reactor in series.

In some instances if the catalyst particles are fragile, particularly when the active iron catalyst is prepared from a compound of iron with a combustible material or in admixture with combustible material, it is beneficial to sinter the catalyst particle before use in the synthesis by maintaining a bed of the treated catalyst in a dense turbulent suspended phase in the presence of a reducing gas at a sintering temperature.

From the above description it will be apparent to those skilled in the art that I have attained the objects of this invention. By my system it is possible to reduce not only new catalyst but regenerated catalyst as well, and to transfer said catalyst directly to the converter or a pretreater in a stream of gas. Thus, by treating the catalyst with hydrogen-rich gas in the fluidized state at between about 50 and 300° F. above the synthesis temperature, at a pressure of between about 200 and 300 pounds per square inch, and at a linear gas velocity in the treating zone of between about 1 and 3 feet per second, a simplified and economical system is provided. This improvement affords considerable economy in equipment, simplifies the handling of the active catalyst, and lowers the ultimate cost of preparing an active catalyst and maintaining the desired activity.

Although a specific embodiment of my invention has been described, it should be understood that this is by way of illustration only and that the invention is not limited thereto. From the above description, modifications will become apparent to those skilled in the art and such modifications and alternatives are contemplated as coming within the scope of the invention which is defined by the appended claims.

I claim:

1. In the method of treating a finely divided iron catalyst having an alkali metal compound adsorbed thereon and tending to agglomerate at temperatures above about 700° F., the steps of passing a reducing gas upwardly through a body of the iron catalyst initially in a dense turbulent suspended phase, increasing the temperature of the catalyst phase above about 700° F. until there is a tendency for the catalyst to settle from the suspended phase, decreasing the temperature to a point where the catalyst is freely suspended in the dense turbulent phase, and alternately increasing and decreasing the temperature as to maintain the catalyst at the highest temperature level at which the body of catalyst can be maintained in the dense turbulent suspended phase.

2. In the method of treating a finely divided iron catalyst having an alkali metal compound adsorbed thereon and tending to agglomerate at elevated temperatures, the steps which comprise passing a reducing gas upwardly through a body of the iron catalyst at an upward linear velocity sufficient to maintain the iron catalyst in a dense turbulent fluidized phase, maintaining the dense turbulent fluidized phase at an elevated temperature until there is an indication of the tendency for the dense turbulent fluidized phase to defluidize and reducing the temperature by about 50° F. for a period sufficient to re-establish the desired dense turbulent fluidized phase.

3. In the method of treating a finely divided iron catalyst having an alkali metal compound adsorbed thereon and tending to agglomerate at elevated temperatures, the steps which comprise passing a reducing gas upwardly through a body of the iron catalyst at an upward linear velocity sufficient to maintain the iron catalyst in a dense turbulent fluidized phase, elevating the temperature until there is an indication of the tendency for the dense turbulent fluidized phase to defluidize, reducing the temperature by at least about 50° F. for a period sufficient to re-establish the desired dense turbulent fluidized phase, and maintaining the dense turbulent fluidized phase at a temperature approaching that at which the catalyst has a tendency to defluidize.

4. In the method of treating a finely divided iron catalyst having a surface coating of an alkali metal compound adsorbed thereon and tending to agglomerate at temperatures above about 700° F., the steps which comprise passing a reducing gas upwardly through a body of the promoted iron catalyst initially in a dense turbulent suspended phase, increasing the temperature of the suspended catalyst phase above about 700° F. until there is an indication of a tendency for the dense turbulent catalyst phase to defluidize, reducing the temperature by at least about 5° F. for a period sufficient to re-establish the desired dense turbulent fluidized phase and maintaining the dense turbulent fluidized phase at a temperature approximating that at which the catalyst has a tendency to defluidize.

ROBERT V. SAFFORD.

REFERENCES CITED

The following references are of record in the file of this patent:

UNITED STATES PATENTS

| Number | Name | Date |
|---|---|---|
| 2,254,806 | Michael | Sept. 2, 1941 |
| 2,360,787 | Murphree | Oct. 17, 1944 |
| 2,414,276 | Sensel et al. | Jan. 14, 1947 |
| 2,417,164 | Huber, Jr. | Mar. 11, 1947 |
| 2,458,870 | Ogorzaly | Jan. 11, 1949 |